United States Patent [19]

Brovko et al.

[11] Patent Number: 5,191,337
[45] Date of Patent: Mar. 2, 1993

[54] RANGING, DETECTION AND RESOLVING IN A MULTISLOPE FREQUENCY MODULATED WAVEFORM RADAR SYSTEM

[75] Inventors: Oleg Brovko, Los Angeles; Trung T. Nguyen, Huntington Beach, both of Calif.

[73] Assignee: Hughes Aircraft Company, Los Angeles, Calif.

[21] Appl. No.: 841,133

[22] Filed: Feb. 25, 1992

[51] Int. Cl.⁵ .................. G01S 13/53; G01S 13/532
[52] U.S. Cl. ................................ 342/200; 342/101; 342/160
[58] Field of Search ............... 342/200, 163, 90, 91, 342/92, 159, 160, 161, 162, 98, 99, 101

[56] References Cited

U.S. PATENT DOCUMENTS

| | | | |
|---|---|---|---|
| H374 | 11/1987 | Abo-Zena et al. | 342/378 |
| 4,031,364 | 6/1977 | Wilmot | 235/151.3 |
| 4,806,936 | 2/1989 | Williams et al. | 342/126 |
| 4,825,213 | 4/1989 | Smrek | 342/25 |
| 4,891,762 | 1/1990 | Chotiros | 364/456 |
| 5,045,860 | 9/1991 | Hodson | 342/451 |
| 5,049,889 | 9/1991 | Hol et al. | 342/160 |

Primary Examiner—John B. Sotomayor
Attorney, Agent, or Firm—L. A. Alkov; W. K. Denson-Low

[57] ABSTRACT

A maximum likelihood estimator and range-only-initialization target detection method employed to detect and resolve targets in a multislope linear frequency modulated waveform radar. The method resolves a large number of target returns without a large amount of signal processing and without creating a significant number of false alarms, or ghosts. The method simultaneously estimates range and doppler for each target. The method rejects undesired long-range targets that fold into target regions, and processes target regions of interest around a nearest target to reduce signal processing throughput requirements. Using a K out of N detection rule, the method detects targets that compete with mainlobe rain clutter, mainlobe ground clutter, and receiver leakage. The method simultaneously estimates target parameters and optimally resolves any number of targets. The method is limited only by the number of frequency modulation ranging slopes, the slope values, and the doppler filter resolution set by the radar waveform design. The method has the ability to process and detect extended targets.

11 Claims, 2 Drawing Sheets

RANGING, DETECTION AND RESOLVING IN A MULTISLOPE FREQUENCY MODULATED WAVEFORM RADAR SYSTEM

BACKGROUND

The present invention relates to radar systems, and more particularly to maximum likelihood estimation and range only initialization methods for use in multislope linear frequency modulated waveform radar systems.

Current multislope linear frequency modulated waveform radar processing techniques are limited to resolving to small number of targets (not more than 4) without a significant increase in ghosts (false alarms). Several techniques currently exist for resolving multiple targets in a radar using a linear frequency modulated waveform. One computes a target range measurement for every possible combination of returns, and another provides range and doppler measurements of the target separately.

Computing all possible combinations needed for target detection requires very large amount of signal processing throughput and yields a large number of ghosts. The requirement of high throughput results in an expensive radar system, and a large number of ghosts creates hazardous conditions. With a system providing range measurement only, the velocity estimate is derived from differencing consecutive range measurements or using filtering. In either case, these estimates require very accurate range measurements and introduce unacceptable latencies.

For automobile applications, such as adaptive cruise control systems, for example, large latency introduces additional risks in automobile "cut-in" or hazardous situations. A system that separately measures range and doppler cannot guarantee that the range and doppler measurements are derived from the same target. Again, this results in an adaptive cruise control system having a very slow response time.

Consequently, it is an objective of the present invention to provide for a maximum likelihood estimation and range only initialization methods for use in multislope linear frequency modulated waveform radar systems that provides for the resolution of a large number of target returns without extensive signal processing, and without creating a significant number of false alarms (ghosts).

SUMMARY OF THE INVENTION

In order to meet the above and other objectives, the present invention provides for a maximum likelihood estimator and range-only-initialization procedure or method that is employed to detect and resolve targets in a multislope linear frequency modulated waveform radar, for example, such as a frequency modulated continuous wave radar for automobile cruise control applications. The present method resolves a large number of target returns, typically encountered in a road environment, without a large amount of signal processing and without creating a significant number of false alarms, or ghosts. The present procedure also simultaneously estimates range and doppler for each target. In addition to resolving targets, the present method also rejects undesired long-range targets that fold into target regions, and has the ability to process target regions of interest (to reduce the signal processing throughput requirement) such as to a region around a nearest target. Using a K out of N detection rule, the present procedure provides the capability of detecting targets that compete with mainlobe rain clutter, mainlobe ground clutter, and receiver leakage.

More particularly, the present invention is used in a multislope linear frequency modulated waveform radar system comprising means for transmitting and receiving radar signals and for processing received frequency modulated waveform radar signals to produce magnitude detected target signals. The present method of processing the magnitude detected target signals to resolve targets corresponding to the magnitude detected target signals comprises the following steps.

The magnitude detected target signals are centroid to provide centroided target signals, wherein the detected target signals comprise a set of detections observed for each phase (slope segment) of the frequency modulated waveform. The centroided target signals are associated using a maximum likelihood estimation procedure to predict the filter position for the next phase, and wherein the associating step groups the detection from each phase by expecting hits to be within a gate size of a projected target doppler filter location, and wherein the projected doppler filter location and the gate size depend on all previous phase observations. A number of targets are eliminated to minimize the number of ghosts by reducing the number of candidate targets that correlate in a predetermined number of phases by grouping paths with a selected number of common hits. The velocity and range for the remaining detected targets are then computed.

As was mentioned above, conventional processing techniques are limited to resolving to small number of targets without significantly increasing ghosts. However, the present method simultaneously estimates target parameters and resolves any number of targets optimally (in a least squares sense). Consequently, the present method is limited only by the number of frequency modulation ranging slopes, the slope values, and the doppler filter resolution set by the radar waveform design. Furthermore, the present method significantly reduces the amount of signal processing required by the system because it adaptively detects and resolves targets in range and doppler regions of interest (for example, the nearest target). In addition, the present method has the ability to process and detect extended targets, such as large trucks, for example.

Production of a long range adaptive cruise control system for automobiles using frequency modulated continuous waveform radar is made feasible by the present invention. Previous systems only provide short range adaptive cruise control systems and do not allow timely response in cut-in situations. Additionally, the ability of the present method to provide instantaneous range and doppler measurement shortens the response time and thus permits a collision warning system to be implemented. In airborne radar applications, for example, the present invention provides a more accurate measurement than current frequency modulated waveform processing techniques having the same signal bandwidth.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
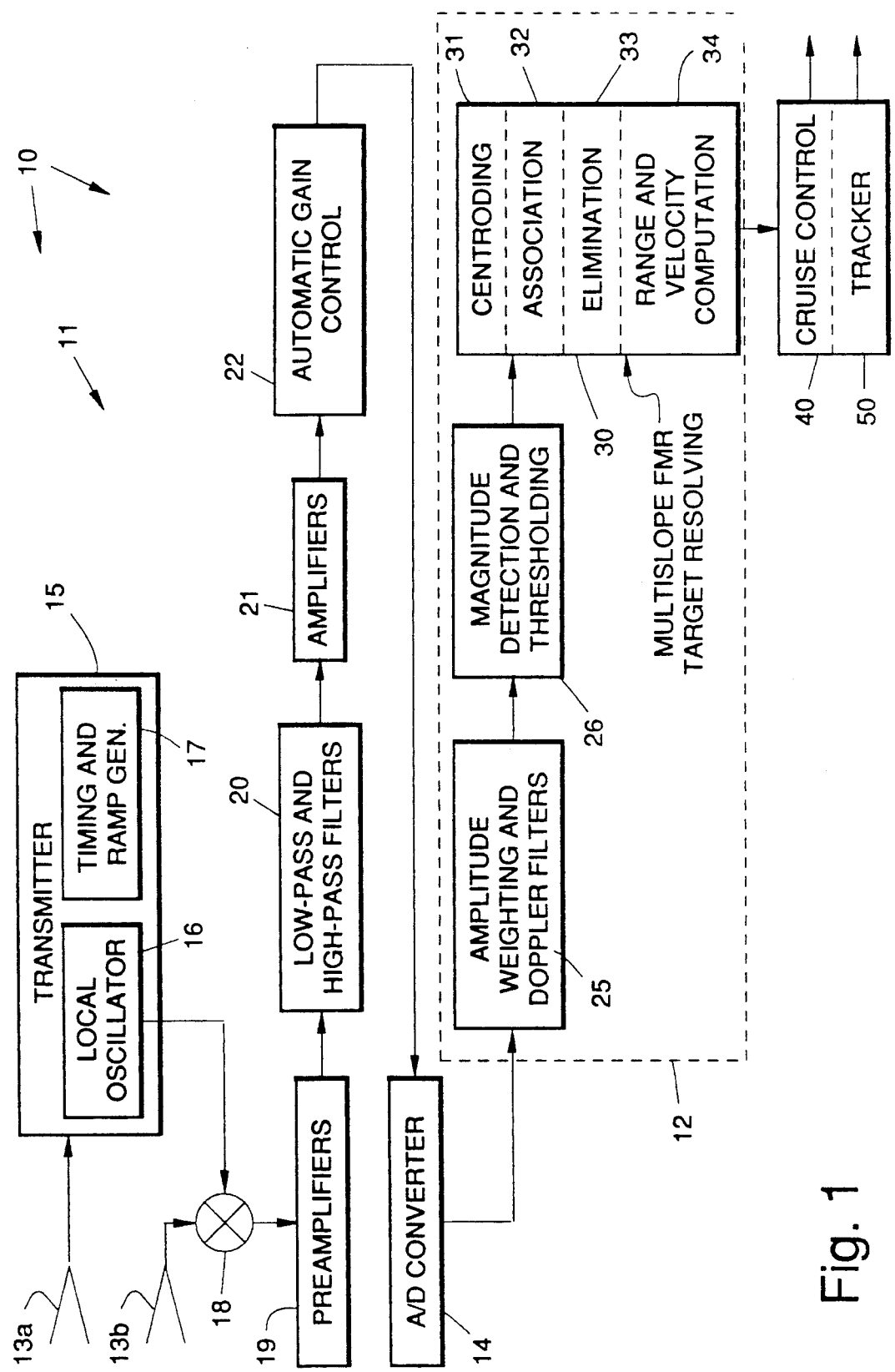
FIG. 1 shows a homodyne frequency modulated continuous wave radar system employing a maximum likelihood estimator and range-only-initialization method in accordance with the principles of the present invention.

Referring to the drawing figures, a system diagram of a homodyne frequency-modulated continuous-wave (FMCW) radar system 10 is shown in FIG. 1. The system 10 is adapted to employ a maximum likehood estimator and range-only-initialization method 30 in accordance with the principles of the present invention. The radar system 10 is conventional in desing and will not be described in detail herein, since such systems are well-known in the art. The radar system 10 has two basic components: a radar front end 11 and a radar digital signal processor 12. The radar front end 11 encompasses that portion of the radar system 10 from a transmitting antenna 13a to the output of an analog-to-digital (A/D) converter 14. In particular, the radar front end 11 comprises a transmitter 15 that is coupled to the transmitting antenna 13a and to a local oscillator 16. The transmitter 15 further includes conventional timing control and ramp generation circuitry 17.

The system 10 comprises a receiver 23 that includes a receiving antenna 13b is also coupled by way of a mixer 18 to a preamplifier circuit 19. The mixer 18 is coupled to the local oscillator 16 and they cooperate to down-convert received radar signals to video frequencies. A preamplifier circuit 19 is coupled to the output of the mixer 18, which is in turn coupled through low-pass and high-pass filtering circuitry 20 that provides for filtering for sensitivity control and anti-aliasing of the video signals. Amplifiers 21, and automatic gain control (AGC) circuitry 22 are serially coupled between the output of the low-pass and high-pass filtering circuitry 20 and the A/D converter 14.

The digital signal processor 12 provides for amplitude weighting and doppler filter processing 25, for a processing method or procedure 26 that implements magnitude detection and thresholding procedure 26 that provides for a target detection, and for the multislope frequency modulated target resolving procedure 30 in accordance with the principles of the present invention. More specifically, the radar digital signal processor 12 extracts target information from a continuous wave linear frequency modulated waveform and the processor 12 implements two major processing procedures. The target detection procedure 26 provides for target detection within each FM phase of the frequency modulation ranging (FMR) waveform. After detection, the target resolving procedure 30 of the present invention associates and resolves range and doppler signals for each detected target provided by the target detection procedure 26 from a set of detections observed for each phase (slope segment) of the frequency modulated ranging waveform. This target detection procedure 30 is at the heart of the present invention.

The multislope frequency modulated ranging target resolving procedure 30 is comprised of a centroiding procedure 31, an association procedure 32 using a maximum likelihood estimator, an elimination procedure 33 to minimize the number of ghosts, and a velocity and range computation procedure 34. These procedures are discussed in detail below. The inputs for the frequency modulation ranging target resolving procedure 30 are the outputs of the magnitude and thresholding prodcedure 26 for each of the FMR phases (N phases). The output of the target resolving procedure 30 is the target range and range rate set (velocity) for each of the targets in a range and doppler region of interest.

The range and range rate data output of the target resolving procedure 30 may be employed as an input to an adaptive cruise control system 40 or to a tracker 50 employed in an airborne radar tracking and missile guidance system, for example. In the cruise control system 40 the range and range rate data may be used to cause an airbag to deploy, or to cause vehicle breaking action through anti-lock brake controls, or to provide collision warning signals to the operator of the vehicle. In the airborne radar system, the tracker 50 uses the range and range rate data to more accurately track potential targets, when compared to tracking systems employing conventional target resolving procedures.

In addition to resolving the target, the target resolving procedure 30 also may be adapted to reject undesired aliased long-range targets and process only target regions of interest (to reduce signal processing throughput requirements) such as a nearest target, for example. Furthermore, when a K out of N detection rule is employed in the target resolving procedure 30, it provides the capability of detecting targets that compete with mainlobe rain clutter, mainlobe ground clutter, and leakage in the receiver 23. The K out of N detection rule is employed in situations where the above-cited noise conditions are present.

The centroiding procedure 31 produces the target position within a filter of the doppler filter 25 and provides a means for handling extended and overlapped targets as will be described below. The centroiding procedure 31 groups target returns of adjacent filters for each phase to form discriminants that estimate target position and extent as follows:

$$f_{est} = \frac{\sum_{f=f_{min}}^{f_{max}} P_t \cdot f}{\sum_{f=f_{min}}^{f_{max}} P_t}$$

$$EXT_{est}^2 = \frac{\sum_{f=f_{min}}^{f_{max}} P_t \cdot f^2}{\sum_{f=f_{min}}^{f_{max}} P_t} - f_{est}^2$$

Figure 2:
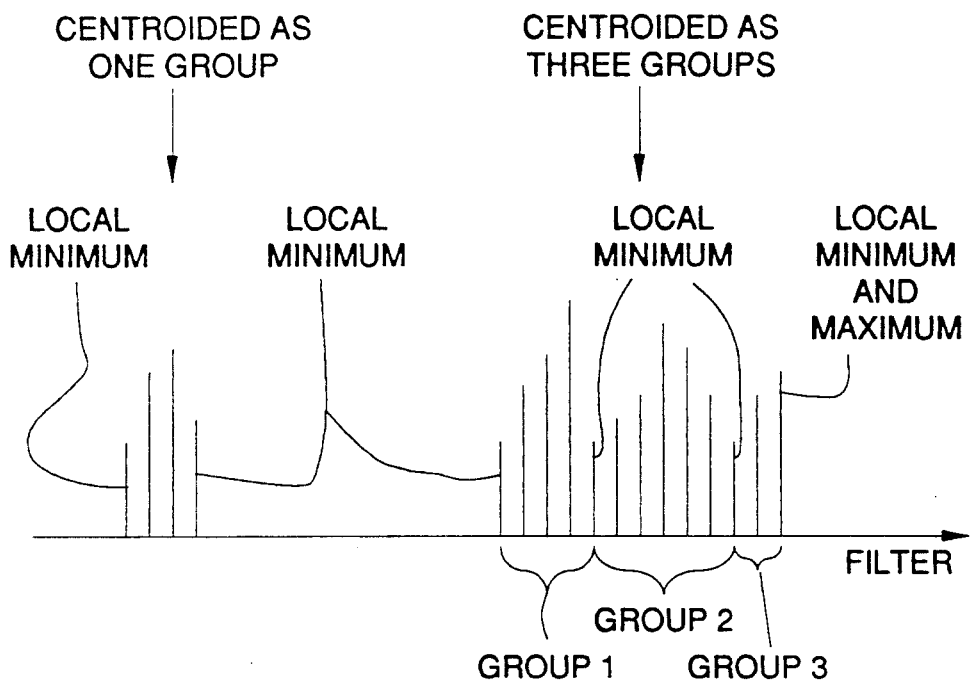
FIG. 2 shows filter grouping employed in the method of FIG. 1.

In the above equations, $P_f$ is the signal power at frequency f, and the indices $f_{min}$ to $f_{max}$ specify a group of adjacent filters to be centroided. The target extent (EXT) discriminant measures the frequency spread that is used for target discrimination. With reference to FIG. 2, the adjacent detected filters are grouped together from a local minimum to another local minimum. FIG. 2 shows the filter grouping employed in the target resolving procedure 30 of FIG. 1. Consequently, if adjacent detected filters have N local peaks, there are N groups that are centroided, as is shown in FIG. 2.

The centroid provides an accurate target position that enhances the target association performance of the association procedure 32 by reducing ghosts. The target extent discriminant is utilized to break up adjoining hits resulting from extended or multiple overlapping targets. This is required in automobile applications, for example, because there is a higher probability of observing large extended targets, such as trucks. Breaking up targets reduces the possibility of losing targets at the risk of increasing the probability of creating a ghost when target filters overlap. The extent logic of the centroiding procedure 31 is also dependant upon the number of contiguous filters. The centroiding procedure 31, as part of the overall FMR resolving procedure 30, is the most significant from a performance point of view.

The association procedure 32 groups the detection from each phase by expecting hits to be within a gate size of projected feasible target doppler filter location. The projected doppler filter location and the gate size depend on all previous FMR phase observations. The association procedure 32 uses the desired range information for initialization, then uses a maximum likelihood estimator to predict the filter position for the next phase.

First, the association procedure 32 associates the detected target filters from two phases with slopes having the same sign. The gate size for the first association is established by the desired minimum and the maximum target ranges. This minimizes the number of potential associations in these two phases and also eliminates all targets at ranges longer than the maximum range. By properly selecting the slope values (the same sign slope is prime to each other), long range rejection can be much larger (10 times) than the maximum range from the waveform. If the system 10 is tailored to provide the nearest target or targets ordered by their distance, then the system 10 is adapted to sort the list of possible associated targets having two same sign slopes. This first step of the association procedure 32 and the selection of the FMR slope values determines the signal processing requirement of the system 10.

With the measurements from the first two slope associations, a maximum likelihood estimator is used to predict the position of the phase return as follows:

$$f_{est}^{(N-1)} = \left( \frac{\bar{\omega} \cdot E_N(s^2) - \bar{p} \cdot E_N(s)}{\sigma_s^2(N)} \right) - s_{N-1} \cdot \left( \frac{\bar{p} - \bar{\omega} \cdot E_N(s)}{\sigma_s^2(N)} \right)$$

where $$\bar{\omega} = \frac{1}{N} \sum_{i=1}^{N} \omega_i$$

$$\bar{p} = \frac{1}{N} \sum_{i=1}^{N} s_i \cdot \omega_i$$

$$E_N(s) = \frac{1}{N} \sum_{i=1}^{N} s_i$$

$$E_N(s^2) = \frac{1}{N} \sum_{i=1}^{N} s_i^2$$

$$\sigma_s^2(N) = \frac{1}{N} \sum_{i=1}^{N} (s_i - E_N(s))^2$$

where $f_{est}^{(N-1)}$ is the position of the phase return, $\omega$ is the average of the target return, $\bar{\omega}_i$ is the value of target returns for slope i, $\bar{p}$ is is the average of the correlation between the slope value and the target return. N is the number of slopes used, $s_i$ is the value of the slope i. $s_i^2$ is the square of the slope value. $E_N(s^2)$ is the second moment of the slope value, $E_N(s)$ is the mean of the slope value. $\sigma_s^2(N)$ is the variance of the slope value. and $s_{N+1}$ is the slope value of the next phase.

If N=2, $s_i$ is the $i^{th}$ phase slope and $\omega_i$ is the frequency measurement for a target hit in the $i^{th}$ phase. The variance of the estimator to set a gate for which the phase 3 return is in the gate with very high probability (for example a three-sigma gate) is:

$$\sigma_f^2 = \frac{E_N(s^2)\sigma_M^2}{N\sigma_s^2(N)} + s_{N+1}^2 \cdot \frac{\sigma_M^2}{N\sigma_s^2(N)}$$

where $\sigma_M^2$ is the variance of the measurement.

Figure 3:
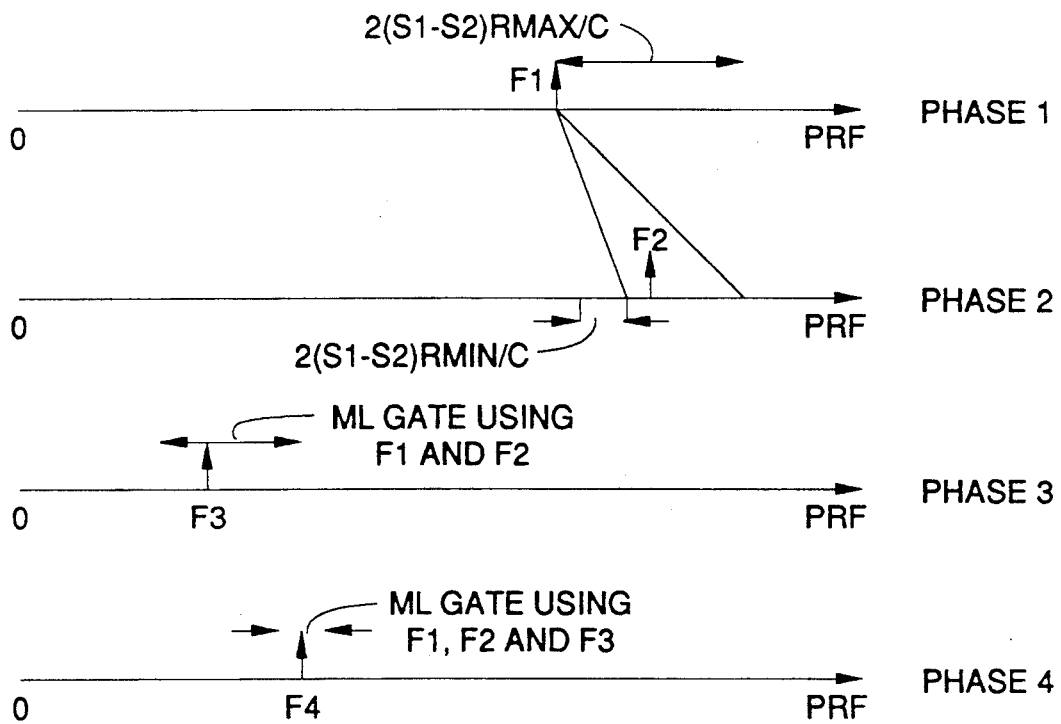
FIG. 3 an association procedure employed in the method of FIG. 1.

If there is an association in phase 3, for example, it will repeat the above step for all the following phase returns (phase number 4 to phase number N) as shown in FIG. 3 (shown for a four FMR-slope system). More specifically, FIG. 3 shows the association procedure 32 employed in the target resolving procedure 30 of FIG. 1.

The above association procedure 32 is for an N out of N detection rule. A similar procedure may applied for a K out of N detection rule. The K out of N detection rule may be used to provide target detection when the target return is predicted to fall in the region for which it has to compete with receiver leakage, mainlobe clutter, or mainlobe rain clutter in some of the FMR phases. In this instance, the association procedure 32 skips the phases in which it predicts the target return will be masked by an interference signal.

The elimination procedure 33 reduces the number of candidate targets that correlate in four FMR phases by grouping all paths with three common hits. The chosen target out of each group is the one with the minimum estimation error. The elimination procedure 33 optimizes performance by greatly reducing the number of ghosts while only slightly decreasing the target detection probability. Since the discriminant function partitions an extended target into individual targets, the elimination procedure 32 groups these parts back into a single target. This is done by grouping targets with the same doppler and a range difference of less than a specified length, such as the length of a car, for example.

The range (R) and velocity (R) computation procedure 34 provides the target range ($R_{est}$) and velocity ($\dot{R}_{est}$) estimates using the following formulas:

$$R_{est} = \frac{c}{2} \left( \frac{\bar{p} - \bar{\omega} \cdot E_N(s)}{\sigma_s^2(N)} \right)$$

$$\dot{R}_{est} = \frac{\lambda}{2} \left( \frac{\bar{\omega} \cdot E_N(s^2) - \bar{p} \cdot E_N(s)}{\sigma_s^2(N)} \right)$$

where c is the speed of light, $\lambda$ is the wavelength, and N is equal to the number of associated slopes. The outputs of the range and velocity computation procedure 34 are the target range and velocity for each target.

The above described invention has been reduced to practice in the form a non-scanning 60-GHz radar and two scanning 60-GHz radars for automobile cruise control applications. The purpose of the non-scanning radar is to show the ability of the radar system 10 operating in complex road scenarios. Tests show that the radar system 10 accurately provides range and range rate measurement of the same target in multiple-target situations. The radar system 10 demonstrates the ability of rejecting large but distant targets by using its waveform processing. The tests show that the centroid procedure 31 effectively discriminates two close targets. Adaptive cruise control system testing demonstrates the performance of the adaptive cruise control system in highway road conditions. The ability to simultaneously measure range and range rate (velocity) significantly enhances the performance of the present system 10 in automobile cut-in situations.

Thus there has been described new and improved maximum likelihood estimation and range only initialization methods for use in multislope linear frequency modulated waveform radar systems. Production of adaptive cruise control systems and collision warning system are made possible by the present invention. Improved airborne radar systems may be made using the present invention to provide more accurate range and range rate measurements than current frequency modulated waveform processing techniques having the same signal bandwidth.

It is to be understood that the above-described embodiment is merely illustrative of one of the many specific embodiments which represent applications of the principles of the present invention. Clearly, numerous and other arrangements can be readily devised by those skilled in the art without departing from the scope of the invention.

What is claimed is:

1. In a multislope linear frequency modulated waveform radar system comprising means for transmitting and receiving radar signals and for processing received frequency modulated waveform radar signals to produce magnitude detected target signals, a method of processing the magnitude detected target signals to resolve targets corresponding to the magnitude detected target signals, said method comprising the steps of:
    centroiding magnitude detected target signals to provide centroided target signals, wherein the magnitude detected target signals comprise a set of detections observed for each phase (slope segment) of the frequency modulated waveform;
    associating the centroided target signals using a maximum likelihood estimation procedure to predict the filter position for the next phase, and wherein the associating step groups the detection from each phase by expecting hits to be within a gate size of a projected target doppler filter location, and wherein the projected doppler filter location and the gate size depend on all previous phase observations;
    eliminating the number of targets to minimize the number of ghosts by reducing the number of candidate targets that correlate in a predetermined number of phases by grouping all paths with a selected number of common hits; and
    computing velocity and range for the remaining detected targets.

2. The method of claim 1 wherein the associating step comprises:
    associating the detected target filters from two phases with slopes having the same sign
    establishing the gate size for the first association based upon desired minimum and maximum target ranges to minimize the number of potential associations in these two phases and also eliminate all targets at ranges longer than the maximum range.

3. The method of claim 1 which further comprises:
    sorting the list of possible associated targets having two same sign slopes to provide the locations of the nearest targets ordered by their distance.

4. The method of claim 1 wherein the associating step comprises:
    an N out of N detection rule.

5. The method of claim 1 wherein the associating step comprises:
    a K out of N detection rule to provide target detection when the target return is predicted to fall in the region for which it has to compete with receiver leakage, mainlobe clutter, and mainlobe rain clutter in some of the FMR phases.

6. The method of claim 5 which further comprises:
    skipping the phases in which the K out of N detection rule predicts the target return is masked by an interference signal.

7. The method of claim 1 wherein the centroiding step produces the target position within a filter of the FFT.

8. The method of claim 1 wherein the centroiding step groups target returns of adjacent filters for each phase to form discriminants that estimate target position and extent.

9. The method of claim 1 wherein the eliminating step minimizes the number of ghosts by selecting a target out of each group that is the one with the minimum estimation error.

10. The method of claim 9 wherein the eliminating step groups individual targets into a single target by grouping targets with the same doppler and a range difference of less than a specified length.

11. The method of claim 1 wherein the step or computing velocity and range for the detected targets provides target range ($R_{est}$) and velocity ($\dot{R}_{est}$) estimates using the following formulas:

$$R_{est} = \frac{c}{2} \left( \frac{\bar{p} - \bar{\omega} \cdot E_N(s)}{\sigma_s^2(N)} \right)$$

$$\dot{R}_{est} = \frac{\lambda}{2} \left( \frac{\bar{\omega} \cdot E_N(s^2) - \bar{p} \cdot E_N(s)}{\sigma_s^2(N)} \right)$$

where c is the speed of light, $\lambda$ is the wavelength, N is equal to the number of associated slopes, $$f_{est}^{(N+1)} = \left( \frac{\bar{\omega} \cdot E_N(s^2) - \bar{p} \cdot E_N(s)}{\sigma_s^2(N)} \right) - s_{N+1} \cdot \left( \frac{\bar{p} - \bar{\omega} \cdot E_N(s)}{\sigma_s^2(N)} \right)$$

where $$\bar{\omega} = \frac{1}{N} \sum_{i=1}^{N} \omega_i$$

$$\bar{p} = \frac{1}{N} \sum_{i=1}^{N} s_1 \cdot \omega_i$$

$$E_N(s) = \frac{1}{N} \sum_{i=1}^{N} s_i$$

-continued $$E_N(s^2) = \frac{1}{N} \sum_{i=1}^{N} s_i^2$$

$$\sigma_s^2(N) = \frac{1}{N} \sum_{i=1}^{N} (s_i - E_N(s))^2$$

and where $f_{est}(N-1)$ is the position of the phase return, $\omega$ is the average of the target return, $\bar{\omega}_i$ is the slope value of target returns for slope i, $\bar{p}$ is is the average of the slope value. N is the number of slopes used, $s_i$ is the value of the slope i, $s_i^2$ is the square of the slope value, $E_N(s^2)$ is the second moment of the slope value, $E_N(s)$ is the mean of the slope value, $\sigma_s^2(N)$ is is the variance of the slope value, and $s_{N+1}$ is the slope value of the next phase.

* * * * *